June 13, 1944.  E. T. WELSH  2,351,087
MOUNTING FOR REAR VISION MIRRORS
Filed May 27, 1941
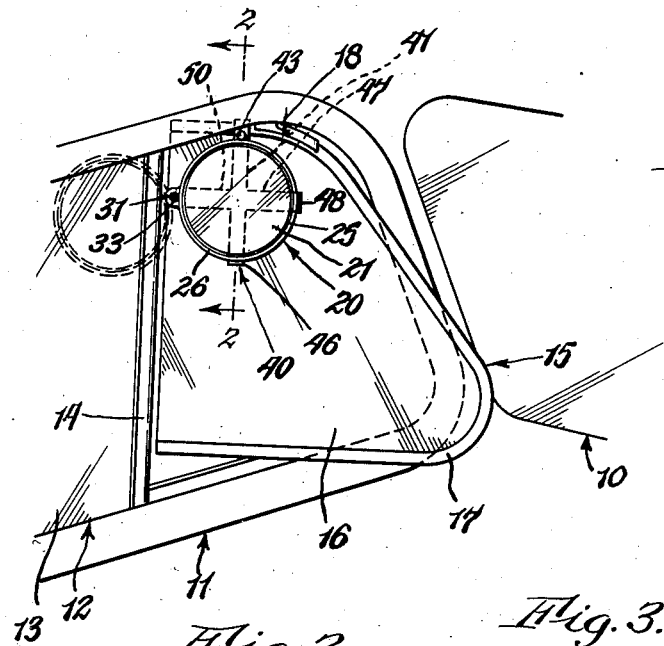
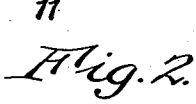
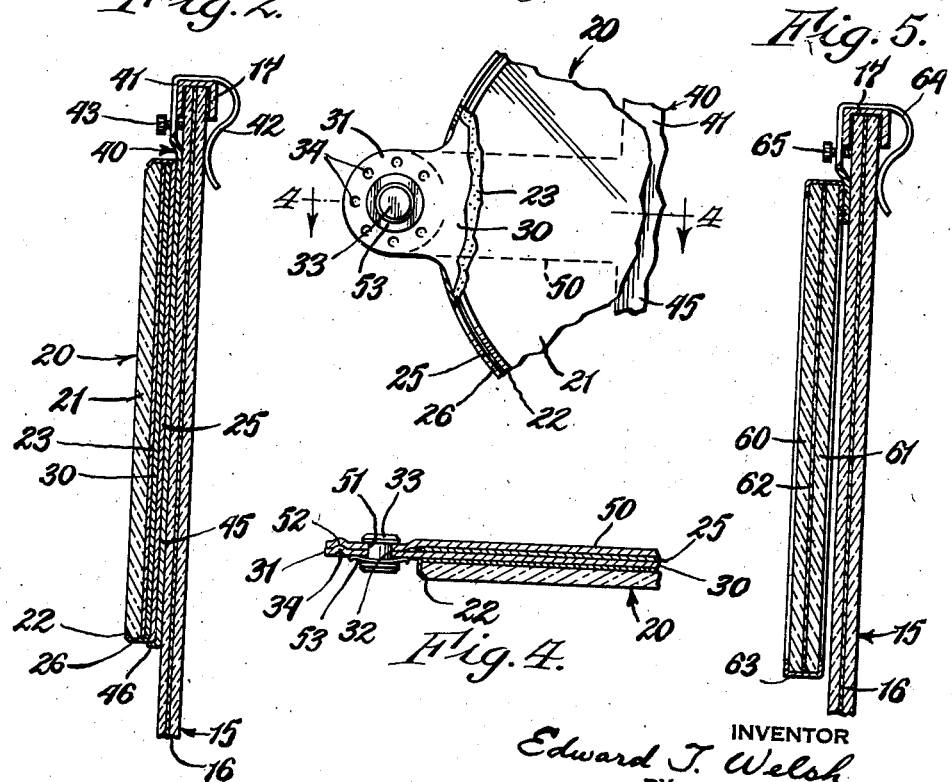
INVENTOR
Edward T. Welsh
BY Popp and Popp
ATTORNEYS Patented June 13, 1944

2,351,087

UNITED STATES PATENT OFFICE 2,351,087

MOUNTING FOR REAR-VISION MIRRORS

Edward T. Welsh, Buffalo, N. Y.

Application May 27, 1941, Serial No. 395,379

2 Claims. (Cl. 88—93)

This invention relates to a mounting for rear vision mirrors and more particularly to such a mounting which includes the forward part of the front side windows of pleasure cars, such forward part being capable of being swung about a vertical axis by means of a crank to provide any desired ventilation of the interior of the car.

The principal object of the invention is to provide a rear vision mirror mounted on the side window adjacent the driver which swings around a vertical axis, the adjustment of this window thereby enabling the driver to obtain a clear view of traffic conditions at the left rear side of the car, such being particularly useful when pulling out of a roadside parking space; when swinging to the left in passing a car or other obstruction ahead; when the rear window of the car is covered with snow; or when the head gear of passengers in the rear seat of the car obstruct the view through the rear window.

Another object of the invention is to provide such a rear vision mirror which is made as a unit separate from the window frame and adapted to be attached thereto, the rear vision mirror being thereby capable of being installed as accessory equipment in pleasure cars now in use without requiring replacement of the window.

Another object is to provide such a mounting in which the mirror is capable of being swung outwardly beyond the window and thereby obtain a still clearer view of the conditions in rear of the car.

Another object is to provide such a mounting in which the mirror can be adjusted vertically to suit the eye height of the seated driver.

Another object is to provide in such an outwardly swinging mounting for the rear vision mirror, stop means for limiting such movement so that the mirror can be conveniently brought back to the same position each time it is desired to use it.

Another purpose is to provide such a rear vision mirror mounting which is simple and inexpensive in construction, which is free from objectionable vibration, in which there is minimum interference with the forward view of the driver and which will stand up under conditions of constant service without getting out of order.

In the accompanying drawing:

Fig. 1 is a fragmentary perspective view of the interior of a pleasure car showing a rear vision mirror mounted, in accordance with my invention, on the part of the side window adjacent the driver which is mounted to swing about a vertical axis.

Fig. 2 is an enlarged, fragmentary, vertical section taken on line 2—2, Fig. 1.

Fig. 3 is an enlarged fragmentary view similar to Fig. 1, showing parts broken away to disclose the operating mechanism.

Fig. 4 is a section taken on line 4—4, Fig. 3.

Fig. 5 is a view similar to Fig. 2 showing a modified form of my invention.

In Fig. 1 is illustrated a pleasure car having the usual windshield 10 and side door 11 at the left of the driver, this side door having the usual window 12. The window 12 is composed of two parts, the rear part 13 comprising a vertically sliding pane of laminated, shatterproof glass, the front edge of which rides in a mullion or vertical guide bar 14 forming a part of the door, and the front part 15 comprising a laminated, shatterproof pane of glass 16 which is framed along its top, bottom and side edges with a channel bar 17 and supported to swing about a vertical axis as by pivots 18. The parts 13 and 15 of the window are usually operated by means of cranks (not shown) the front part 15 being capable of being swung to the so-called "no-draft" position shown or being capable of being swung with its forward end projecting outwardly to scoop air into the car.

The invention consists in mounting a rear vision mirror, indicated generally at 20, on the upper rear corner of the part 15 of the window which swings about a vertical axis. By this means, it will be seen that a rear vision mirror for directly observing conditions at the left of the car is conveniently provided by the simple expedient of opening the no-draft window 15 toward the position shown in Fig. 1 until the desired view at the left rear of the car is brought into view. By this use of the rear vision mirror, the danger of accidents in pulling out of a parking space at the side of the road is greatly reduced as the driver can readily ascertain whether a car is about to pass close by. At the same time when the no-draft window is closed, the rear vision mirror 20 is arranged inside of the car and hence protected against weathering.

While the rear vision mirror can be built into the glass 16 of the no-draft window itself, I prefer to construct it as a separate unit capable of being attached as an accessory to such windows as now in use and also prefer that the mirror panel itself be capable of being swung beyond the rear edge of the glass panel 16 to provide an improved view of the conditions in rear of the car. For this purpose, the rear vision mirror is shown in Figs. 1–4 as comprising a round glass mirror panel 21, beveled at its edges, as indicated at 22, and provided on its rear face with the usual coating 23 of silver or other reflective material. The glass mirror panel 21 is shown as encased in a round metal backing plate or case 25, the forwardly flanged edge 26 of which is bent, crimped or spun about the bevel 22 of the glass mirror panel 21 to provide a unitary structure.

Before this assembly of the glass mirror panel 21 in the metal case 25, a circular inner plate 30 is inserted into the case behind the glass mirror panel 21, this inner plate being stamped of relatively heavy metal as compared with the case 25 itself and having an ear 31 which projects through a slot provided in the base of the marginal flange 26 of the case 25. This ear is provided with a central opening 32 to receive a pivot pin 33 and concentric with the axis of this pivot pin the ear 31 is provided with an annular series of rearwardly projecting, uniformly spaced buttons 34.

The rear vision mirror assembly is pivotally supported through the pivot pin 33 on a supporting structure which is removably secured to the no-draft window 15 and is preferably of skeleton form so as to result in minimum interference to the forward view of the driver. For this purpose the support is in the form of a cruciform plate 40 having its upwardly projecting arm 41 bent to provide a hook 42 adapted to hook over the metal rim 17 of the window 15 at its upper edge, as best illustrated in Fig. 2. To positively secure this hook 42 to the window, a set screw 43 is mounted in the front side of this hook in position to be screwed against the surface of the glass pane 16 immediately adjacent the metal rim 17, as best illustrated in Fig. 2.

The downwardly projecting arm 45 of the cruciform supporting plate 40 is flanged laterally, as indicated at 46, to provide a rest for the bottom edge of the encased mirror panel and the forwardly projecting arm 47 of this cruciform supporting plate is similarly flanged, as indicated at 48, to engage the forward edge of the encased mirror panel. The rearwardly extending arm 50 of this cruciform supporting plate 40 is apertured at its end, as indicated at 51, to receive the pivot pin 33, and concentric with the axis of this pivot pin is provided on its front face with an annular series of recesses 52 matching the annular series of buttons 34 provided on the ear 31. The pivot pin 33 is preferably in the form of a double headed pin and to secure firm frictional engagement between the ear 31 of the encased mirror assembly and the arm 50 of the cruciform supporting plate 40, a spring washer 53 is preferably interposed between one head of the pivot pin and the adjacent face of the mirror assembly, as best seen in Fig. 4.

With the form of the invention illustrated in Figs. 1-4, it will be seen that the driver can swing the no-draft window 15 about its vertical axis toward the position shown in Fig. 1 until he has a view of the rear left of the car. Thereafter if he desires a clearer view of conditions in the rear of the car he can grasp the mirror panel assembly and swing it about the axis of the pivot pin 33 toward the dotted line position shown in Fig. 1. This not only extends the rear vision mirror further out to obtain a better view but also permits of adjusting the height of the mirror relative to the car seat so that the driver can locate the mirror at the level of his eyes regardless of his stature. The buttons 34 and recesses 52 provide intermittent stops which facilitate this adjustment of the mirror assembly to the desired height and the spring washer 53 serves to insure the mirror being held in such adjusted position and free from vibration.

In Fig. 5 is illustrated a simplified form of the invention which is not so adjustable. As there shown two circular glass mirror panels 60 and 61 are arranged with their silvered faces back to back with a cardboard protecting disk 62 interposed therebetween. This assembly of glass mirror panels is held in a circular metal rim 63 which is channel shaped in cross section to receive and hold the edges of the two mirror panels. A hook 64 is suitably welded to the side of the rim 63 at its top and arranged to engage over the upper part of the rim 17 of the window 15. To positively hold the assembly in position a set screw 65 is provided in the front side of the hook 64 to screw against the glass panel 16 immediately adjacent the rim 17 thereof.

The form of the mirror shown in Fig. 5 is, of course, of much simpler and less expensive construction than that illustrated in Figs. 1-4 and performs the same function except that it cannot be swung to extend beyond the vertical edge of the no-draft window panel and cannot be adjusted as to height.

From the foregoing it will be seen that the mounting forming the subject of the present invention provides a convenient left hand outboard rear vision mirror by the simple expedient of adjusting the no-draft window to provide the desired reflection of the mirror. It will further be seen that the mirror is adaptable as an accessory to cars now in use and that in its preferred form it can be swung from its normal window mounting to provide a still better view of conditions in rear of the car and to adjust it to suit the eye height of the seated driver.

I claim as my invention:

1. A mounting for securing a rear vision mirror to a window in the side of the car adjacent the driver which window is capable of being swung about a vertical central axis, comprising a sheet metal cruciform support having an upwardly projecting arm formed to provide a hook and arranged to engage over the upper edge of said window in rear of the vertical central axis thereof and having its lower arm formed to provide a rest, a mirror panel, a metal case supporting said mirror panel and adapted to engage said rest and means for supporting said encased mirror panel on said support with the back of said case against the inside face of said window whereby upon swinging the rear part of said window outwardly about said vertical axis an outboard rear vision mirror is provided, the adjustment of which is determined by the setting of said window, comprising an ear projecting horizontally outward from said case and a horizontal pivot pin securing said ear to one arm of said support, said encased mirror being thereby capable of being swung about the axis of said pivot pin to a position extending beyond the outer edge of said window.

2. A mounting for securing a rear vision mirror to a window in the side of the car adjacent the driver which window is capable of being swung about a vertical central axis, comprising a support secured to the upper part of said window in rear of the vertical axis thereof, a single horizontal pivot pin carried by said support and projecting perpendicular to said window, a round mirror panel secured to said pivot pin to swing about the axis thereof, said mirror panel being normally arranged with its back against the inside of said window and with said pivot pin adjacent the rear edge of said window whereby upon swinging the rear edge of said window outwardly said mirror panel is moved to provide a rear vision mirror and the mirror panel being movable about said pivot pin to project beyond the rear edge of said window and also to be arranged at different vertical positions to suit the eye height of the driver.

EDWARD T. WELSH.